United States Patent [19]

Krammer, deceased

[11] 4,143,599

[45] Mar. 13, 1979

[54] POWER AND FREE TROLLEY APPARATUS

[75] Inventor: Robert Krammer, deceased, late of White Bear Lake, Minn., by Ruth Kramer, administratrix

[73] Assignee: A-T-O Inc., Willoughby, Ohio

[21] Appl. No.: 837,275

[22] Filed: Sep. 27, 1977

[51] Int. Cl.² ............................................. B61B 10/02
[52] U.S. Cl. ................................. 104/172 S; 104/103
[58] Field of Search .................. 104/172 S, 89, 91, 94, 104/95, 96, 102, 103, 250, 178

[56] References Cited

U.S. PATENT DOCUMENTS

| | | | |
|---|---|---|---|
| 3,044,416 | 7/1962 | Reibel et al. | 104/172 S |
| 3,397,650 | 8/1968 | Kondur et al. | 104/172 S |
| 3,420,188 | 1/1969 | Dehne et al. | 104/178 X |
| 3,874,304 | 4/1975 | Robert | 104/172 S |
| 3,882,787 | 5/1975 | Turner | 104/172 S X |

*Primary Examiner*—Albert J. Makay
*Assistant Examiner*—Randolph A. Reese
*Attorney, Agent, or Firm*—Wood, Herron & Evans

[57] ABSTRACT

Improved power and free trolley apparatus includes independent pusher and hold back dogs positively moved to an accumulate position by a counterweighted actuating lever moving to an accumulate position. The dogs, however, are self-biased, the pusher dog self-locking in its drive position, and the dogs are not interlocked with the lever. They move independently of the lever into operative position when the lever is moved into a non-actuating position and out of blocking relationship with the dogs. The actuating lever counterweight defines a trolley brake for preventing excessive trolley bounce back during accumulation. Another aspect of the invention includes a movable cam selectively raising a drive dog in a trailing trolley for switching, and permitting accumulation of trolleys through a switch zone when held in an inoperative position as when the switch zone is choked.

25 Claims, 14 Drawing Figures

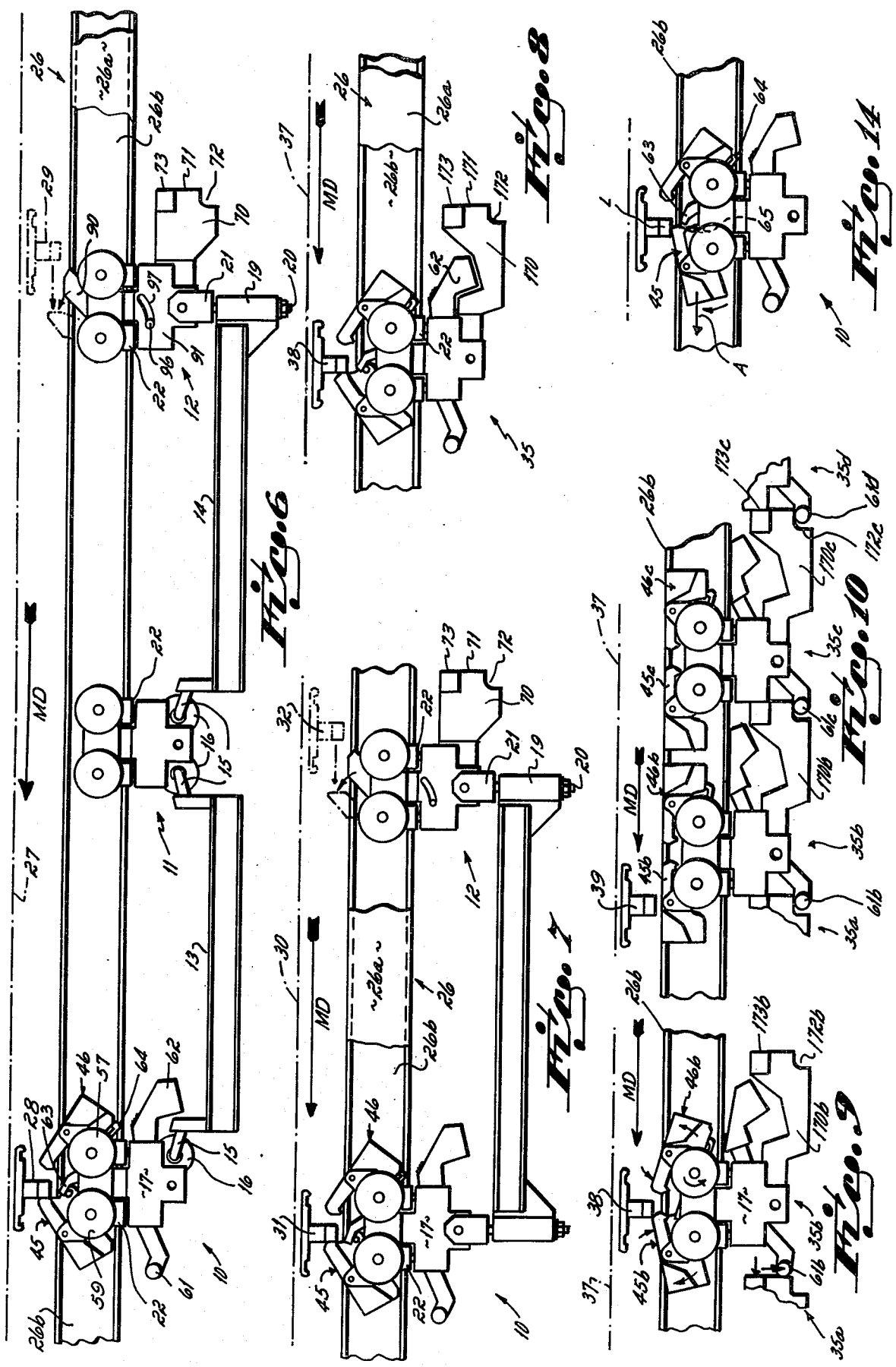

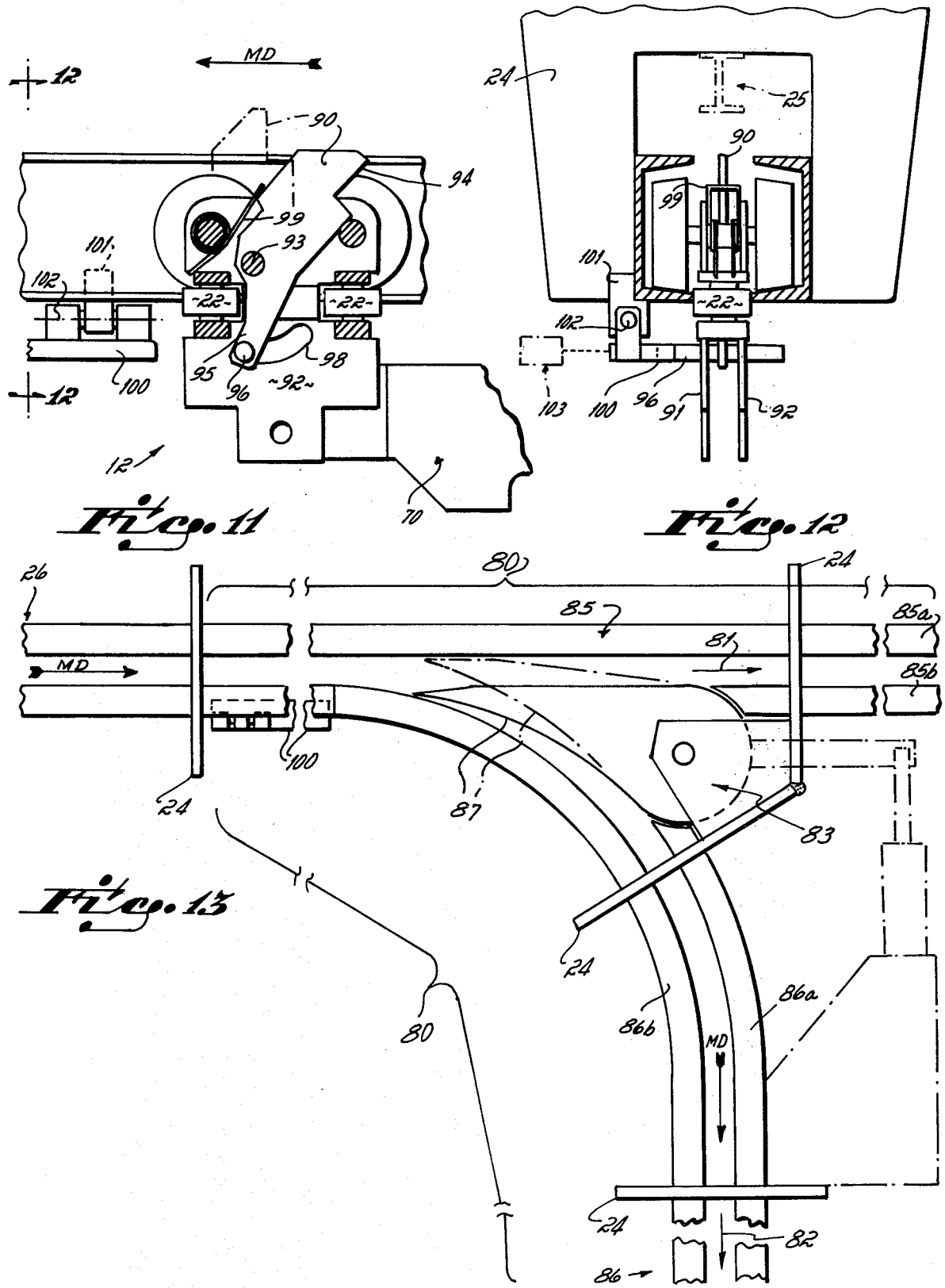

POWER AND FREE TROLLEY APPARATUS

This invention relates to power and free conveyors and more particularly to trolley apparatus and drive controls in such conveyors.

Typical power and free conveyors include a free track on which trolleys are mounted, and a power track carrying a propelling member such as a chain and depending chain lug for driving the trolleys. Prior trolleys may be in trains of several trolleys, or in single trolley configuration. They generally utilize pusher and hold back dogs, in the forward or single trolleys, for operatively connecting the trolleys to the propelling member. In a configuration where the propelling member is above the trolleys, the pusher and hold back dogs are raised above the trolley to engage the chain lug, for example. The pusher dog is typically ahead of the chain lug and is pushed by it, thereby towing the trolley. The hold back dog is typically behind the chain lug and engages it to hold the trolley against forward movement with respect to the chain lug. Such movement is undesirable but could occur on down hill runs, for example.

When these trolleys engage one another, they may be accumulated by withdrawal of the pusher dog from the chain lug. This is generally accomplished by a forwardly extending level which engages the preceding trolley and is pivoted upwardly to withdraw the pusher dog. The succeeding chain dogs then have nothing positive to engage and the trolleys can accumulate without jamming the system. Once the leading trolley leaves the accumulated pack, the lever, which is usually heavily counterweighted and interlocked with the pusher dog, returns to its normal position and raises the pusher dog for engagement by the next chain lug.

Such designs have several disadvantages relating to power and free conveyor operations and capabilities. First, such systems depend on a heavy actuating lever counterweight to raise the pusher dog. They thus are subject to unexpected disengagement due to heavy uphill towing, towing pressure, swinging loads and the like. Secondly, should the lever move when the pusher dog is directly under a chain lug, the frictional force generated by the heavy counterweight may be sufficient to raise the pusher dog into substantial frictional contact with, but beneath the chain lug. The trolley could thus be driven some distance along the track. Thereafter, such as on an uphill run, curve, or in any situation where the friction is overcome, the chain lug will slip over the pusher dog and the trolley will become randomly free and uncontrolled in the line. This is undesirable as it may cause operating or process failures, or unwanted accumulation of succeeding trolleys.

Moreover, in some prior devices the hold back dogs are not positively retracted and when the trolleys accumulate, depending chain dogs engage and pivot them out of the way, causing wear and undesirable noise.

A further disadvantage arises from the situation when a conveyor user desires to push a free trolley forwardly to overtake a chain lug. In this situation, the pusher dog typically is folded down by movement under the chain lug. This, however, requires actuation of the entire interlocked counterweighted lever arm mechanism.

Finally, where single trolleys are accumulated, the prior massive bumper and lever mechanism, coupled with the typically required lever movement, require apparatus which extends forwardly and rearwardly of the trolleys to such an extent as to limit the minimum trolley-to-trolley distance, and thereby the number of trolleys which can be accumulated in a given line distance.

Accordingly, a trolley apparatus wherein the trolleys are not subject to being driven by mere frictional, as opposed to positive driving engagement, wherein the trolleys are not subject to random uncontrolled disengagement but are self-locking, and wherein single trolley-to-trolley spacing in accumulation banks is minimized, is desirable.

Simplified trolleys whereby hold back dogs are positively retracted in an accumulation mode and wherein internal actuating lever movements resulting from a trolley's overtaking a chain dog are not required are also desirable.

It has thus been an objective of the present invention to provide improved power and free accumulating trolley apparatus not subject to the disadvantages of an interlocked actuating lever and pusher dog.

A further objective of the invention has been to provide an improved power and free trolley apparatus wherein a hold back dog is positively retracted in an accumulation mode, and wherein a pusher dog may be folded down, when overtaking a chain lug, without requiring actuation of the accumulation lever mechanism.

A further objective has been to provide improved accumulating trolley apparatus having a self-locking pusher dog independent of the counterweighted actuating lever.

In many power and free conveyor systems, it is desirable to switch trolleys from one conveyor route to another. This is accomplished in a switching zone having a switch for selectively passing trolleys to one route or another. When trolley trains of the type having two or more trolleys are used, the pusher dogs are typically mounted on the forward trolley. If switched, this trolley diverges from the main conveyor route and power propelling member, whereupon it is no longer driven at the point the pusher dog diverges from the path of the chain lug.

To insure that the forward trolley will be picked up by the switch route propelling member, or by a downhill gravity run of the switch route, it is necessary to drive it through the switch. In most instances, this is accomplished by a drive dog on a trailing trolley. This dog can be raised by a cam, upstream of the switch, to be engaged by a following main conveyor route chain lug, and when engaged, serves to push the trolley train, and the forward trolley, through the switch and deeper into the switch zone where it can be picked up by a chain lug on the switch route, for example.

A problem arises in this operation, however, when trolleys are accumulated on the switch route, or when there is a loose trolley in the switch zone for some reason. If there is not enough space for a succeeding trolley train, the forward trolley will engage the rear end of the last accumulated trolley. The lever will be actuated to withdraw the forward trolley's pusher dog; however, the trolley train is now driven by the drive dog in the trailing trolley which is not operated by the lever. A catastrophic jam or necessary shutdown results.

Similarly, the same type of jam may result from an accumulation of the trolleys on the main route in the switching zone, a succeeding trolley being driven into the rear end of the last accumulated trolley by a main route chain lug's engagement of the cam on the trailing trolley.

Accordingly, it has been another objective of the invention to provide an improved power and free conveyor apparatus having a drive control permitting accumulation of trolleys through a switching zone without causing jams or requiring the power track to be shut down.

To these ends, the invention contemplates, in a preferred embodiment, a power and free trolley apparatus wherein a leading or single accumulating trolley includes pusher and hold back dogs each of which are independently biased into raised position, and an actuating lever for withdrawing both dogs into an accumulate position but which is not interlocked with the dogs so that the dogs move on their own, independently of positive engagement with the lever, into their raised positions whenever the lever is not actuated to initiate accumulation. Each dog's movement into operative or raised position is thus in response to the lever's movement in a direction away from the dogs, but the dog's movements are generated by their own counterweights. Relatively light counterweights are used for each dog, as opposed to the counterweight required for the lever, and the bias so applied to the dogs is not sufficient to move the trolley, should a dog raise directly under a drive chain lug.

Since each dog is biased into operative position under its own counterweight, it is considered to be self-locking. The pusher dog does not depend on the weight of the actuating lever to keep it in position, and it will not release under any pressure, even on incline, but is locked into position by the driving chain lug. The hold back dog is also self-locking and cannot disengage on down hill ramps and the like.

Further, it will be appreciated that the raised pusher dog being independent of the actuating lever, the preferred trolley described above can overtake a drive chain lug, the pusher dog simply folding thereunder against its own counterweight without requiring operation or cycling of the actuating lever. Moreover, since the hold back dog is positively moved to a withdrawn inoperative or accumulate position by the actuating lever, it is not cycled every time a drive chain dog passes it when the trolley is in an accumulation status.

The preferred trolleys are provided with rearwardly extending bumpers having vertical surfaces for engagement by the leading nose or end of the actuating lever of the next trolley. When the lever's end hits the surface, it moves downwardly, and rearwardly with respect to the trolley it is associated with until it falls into a detent at the bottom of the vertical surface of the preceding trolley bumper. The bumpers also provide a bumper surface engaged by a forward portion of the succeeding trolley, positively stopping it.

In a further aspect of the invention, the counterweight of the preferred actuating lever is provided with an upper serrated surface and is disposed such that when the actuating lever is urged into its accumulation position, the serrated surface of the counterweight engages the bottom of the free track to brake the trolley and prevent bounce-back of the trolley out of accumulating position. Such bounce-back can occur when a trolley engages the rear end of a preceding stopped trolley.

The succeeding trolley's actuating lever hits the vertical surface and goes into the detent where the lever is in accumulating mode, having withdrawn the dogs.

When the trolley hits the preceding trolley's bumper, however, it may under some circumstances bounce back. If this is severe, the trolley will bounce back sufficiently to permit the actuating lever to move out of the detent and upwardly, whereby the pusher dog will be released. The dog will be engaged by the next drive chain lug and this will bang the succeeding trolley again into the preceeding trolley's bumper. This action may continue in a cycle, the trolleys taking a continuous beating.

The braking action of the preferred trolley described above prevents this. In addition, the depth of the detent is selected so that any partial bounce-back, despite the brake, may occur without release of the actuating lever.

In a still further aspect of the invention, improved drive control apparatus permits accumulation of a trolley train through a switching zone via a selectively movable cam controlled to lift a drive dog in a trailing trolley and to push the trolley train substantially onto the switch route, only when there is room for a switched trolley in the switch route. If the switch route is "choked" (i.e., another trolley is in the zone) or if the main route in the switch zone is choked, the cam will not be moved and the drive dog in the trailing trolley will not be raised. Trolleys can then accumulate in normal fashion, through the switch zone on either route, without causing a catastrophic jam and without requiring shutdown.

These and other objectives and advantages will become more apparent from the following detailed description of a preferred embodiment of the invention, and from the drawings in which:

FIG. 6 is a side view of a three-trolley train according to the invention;

FIG. 7 is a side view of a two-trolley train according to the invention;

FIG. 8 is a side view of a single accumulating trolley according to the invention and provided with a bumper;

FIG. 9 is a side view of the trolley of FIG. 8 approaching an accumulate position;

FIG. 10 is a side view of accumulated single accumulation trolleys;

FIG. 11 is a cut-away view of a trailing trolley and movable cam actuator according to the invention;

FIG. 12 is a cross-sectional view taken along lines 12—12 of FIG. 11;

FIG. 13 is a plan view of a switching zone according to the invention; and

FIG. 14 is a view showing a pusher dog overtaking a chain lug.

Figures 1, 2:
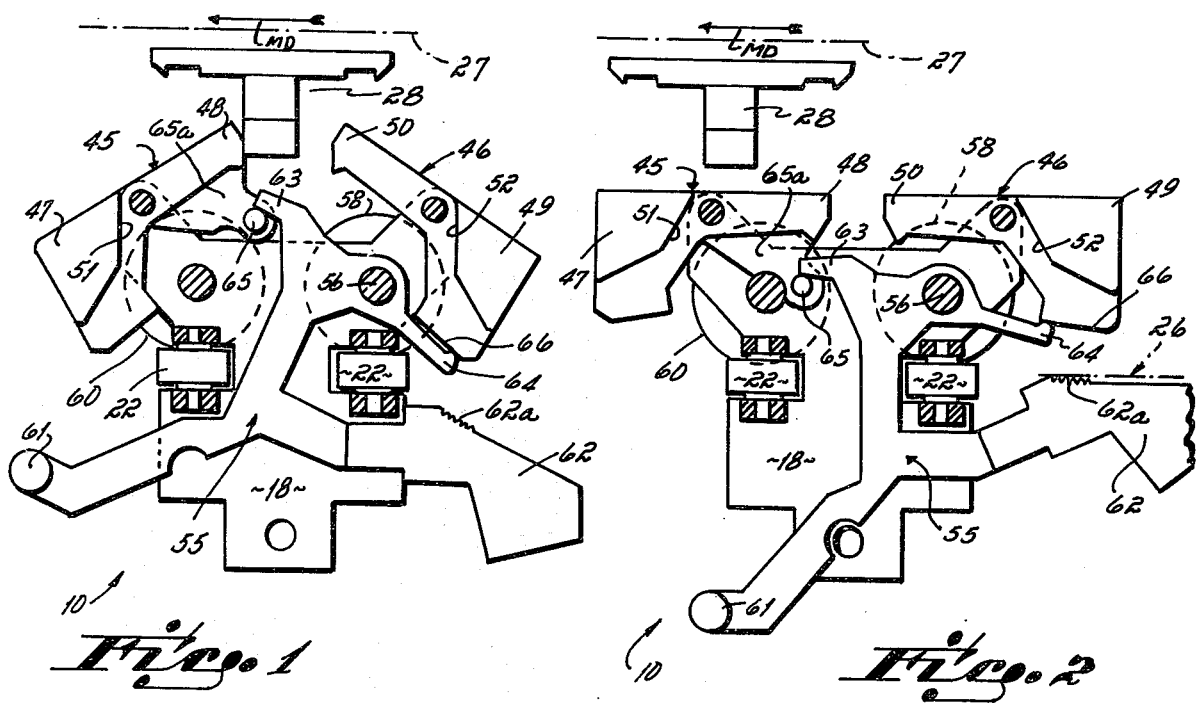
FIG. 1 is a cut-away view showing a leading or accumulating power and free trolley according to the invention.
FIG. 2 is a view similar to FIG. 1 showing the trolley of FIG. 1 in accumulate position.

Turning now to the drawings, an accumulating or leading trolley 10 is shown in FIG. 1 in cut-away view exposing the accumulating apparatus therein according to the invention. The details of the accumulating trolley, with the exception of a bumper as will be described, are essentially the same as those for a single accumulating trolley 35, according to the invention as shown in FIGS. 8-10, standard parts thus being used for each.

The accumulating or leading trolley 10 of FIGS. 1-7 has no rear bumper since it is the first trolley in a train of two, three or more trolleys as shown in FIGS. 7 and 6, respectively. The single accumulating trolley 35, as shown in FIGS. 8-10, requires a bumper since these trolleys operate as single or individual trolleys as will be appreciated.

Figures 3, 4, 5:
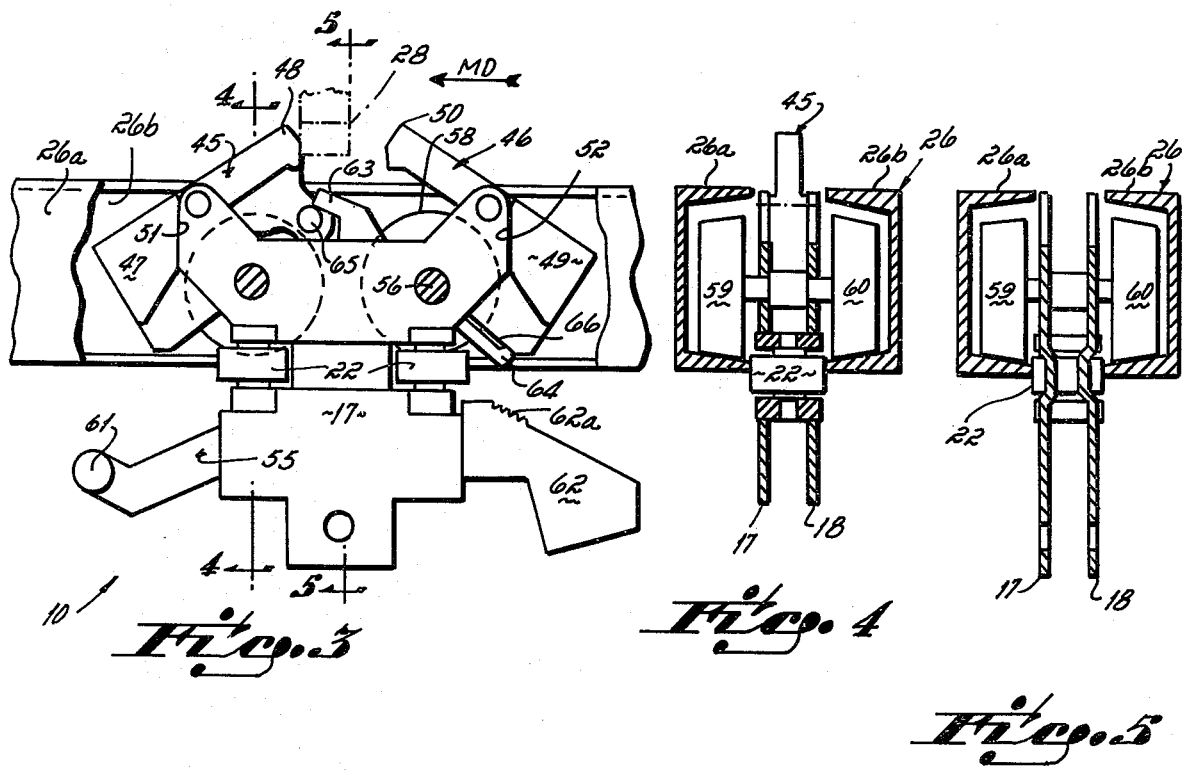
FIG. 3 is a side view of the trolley of FIG. 1.
FIG. 4 is a cross-sectional view taken along lines 4—4 of FIG. 3.
FIG. 5 is a cross-sectional view taken along lines 5—5 of FIG. 3.

For purposes of initial explanation, reference is now made to FIGS. 6-8 wherein various power and free trolleys and trolley trains are shown. FIG. 6 depicts a three-trolley train comprising a leading or accumulating trolley 10, an intermediate trolley 11, and a trailing trolley 12. The trolleys are joined by articulating load bars 13 and 14 for supporting a load which hangs from the bars. Each end of the load bars 13, 14 is constructed to provide articulation in both horizontal and vertical directions, permitting the trolley train to move around horizontal curves and through vertical bends such as inclines or declines. The ends of bar 13, and the forward end of bar 14, utilize a U-shaped bracket 15 mounted in a ring 16 secured between plates 17 and 18 defining portions of a trolley body (FIG. 5). Intermediate trolley 11 is also provided with rings 16 in the same fashion.

The rear end of bar 14 is provided with, for illustration, an articulated pin connector including a boss 19, vertical pin 20 and bracket 21 horizontally pivoted to the body of trailing trolley 12. Any suitable form of articulating connector can be used.

By way of further description of each trolley 10, 11, 12, 35, guide wheels 22 are disposed between flanges of the free track 26.

As shown in FIG. 6, the three-trolley train is mounted in a power and free conveyor having a power track 25 (not shown in detail, see FIG. 12) and a free track 26 disposed under the power track. The power track 25 carries, via appropriate rollers, connectors, hangers and the like, a chain 27, also not shown in detail, but including downwardly depending trolley drive lugs disposed at regular intervals along chain 27. Lugs 28 and 29 are shown. These lugs drive the trolleys along the free track 26 as will be appreciated. Each of the power and free tracks is preferably supported by a plurality of horseshoe-shaped supports 24 as diagrammatically shown in FIG. 12 and as seen in FIG. 13 in plan view.

FIG. 7 depicts a two-trolley train having a leading or accumulating trolley 10 and a trailing trolley 12 as used in the three-trolley train of FIG. 6. Intermediate trolley 11 is not used in a two-trolley train, and trolleys 11 and 12 are connected by an articulating load bar 13a having an articulating pin and bracket connector as has been described with reference to load bar 14.

The chain 30, disposed in the power track (not shown) in FIG. 7 has depending trolley drive lugs disposed therealong at regular intervals, lugs 31 and 32 being shown.

Turning to FIG. 8, a single accumulating trolley 35 is shown. Single accumulating trolley 35 differs from leading or accumulating trolley 10 only by virtue of including bumper 170 and by the fact it is not permanently connected to another trolley. Chain 37, associated with the power track of the power and free conveyor of FIGS. 8-10 has depending trolley drive lugs at regular intervals, lugs 38 and 39 being shown in FIGS. 8-10.

Selection of single trolleys or trolley trains is based largely upon the character of the job to be done, including weight and size of the object to be conveyed. The trolley systems described above are illustrative of various trolley configurations showing how single trolleys or multiple trolley trains are provided according to the invention.

LEADING ACCUMULATING TROLLEY

Considering now the details of the trolleys according to the invention, FIG. 1 shows a leading or accumulating trolley 10 having a pusher dog 45, and a hold back dog 46. Trolley 10 is shown here disconnected from any intermediate or trailing trolley for clarity.

Pusher dog 45 is pivoted between two trolley body plates 17, 18 and includes a counterweighted end 47, and a chain lug engaging end 48. Pusher dog 45 is thus weighted and biased counterclockwise as shown in FIG. 1 into a raised or a drive position as shown.

Hold back dog 46 includes a counterweighted end 49 and a chain lug engageable end 50. Dog 46 is biased by counterweight 49, in a clockwise direction as viewed in FIG. 1, and into a hold back or operative position as shown.

A surface 51 on counterweight end 47 provides a pivot stop for dog 45, as does surface 52 on dog 46. These surfaces engage edges of plates 17, 18 to hold the dogs in their raised positions as shown. Only plate 17 is shown in FIG. 3. Each dog 45 and 46 is thus independently self-biased into raised position for engagement with a chain lug.

It will also be appreciated that when engaged by a chain lug, the pusher dog 45 is self-locking, the lug tending to rotate the dog about its pivot axis. The stop 51 prevents this, however, and the dog is thus self-locked into operative position and is not subject to disengagement in the presence of heavy towing loads, uphill inclines and the like. The hold back dog is similarly self-locked, via engagement with the chain lug, when the trolley moves to overtake the lug, as on a decline for example. These locking positions are independent of the lever arm 55 and counterweight 62 as will be described.

Trolley 10 further includes actuating lever or crank means 55 pivoted about pivot axis 56 of rear wheels 57, 58. Both rear wheels 57, 58 and front wheels 59 (FIGS. 4 and 5) and 60 are disposed on lower flanges of channels 26a and 26b defining free track 26.

The lever 55 includes a forward or leading end or nose 61 which is preferably a rod supported at midpoint by lever 55. A lever counterweight 62 is attached to lever 55 for biasing the lever in a clockwise direction, as viewed in FIG. 1, about axis 56 and into a first position. Counterweight 62 includes an upper serrated braking surface 62a as will be discussed. Of course, elastomeric, plastic or other material could be used as a braking surface.

Lever 55 also includes dog engaging arms 63 and 64 on opposite sides of pivot 56. Arm 63 extends toward pusher dog 45 for engagement with pin 65 mounted on plate 65a of dog 45. Arm 64 extends toward hold back dog 46 for engagement with surface 66 on that dog.

From this description it will be appreciated that both pusher dog and hold down dog are independently mounted with respect to each other and are always in their raised positions when the lever 55 is in the first position of FIGS. 1 and 3. Counterweight 62 biases lever 55 into its first position as also shown in FIGS. 1 and 3. Pusher dog 45 and hold back dog 46, however, are held in their raised positions by means of their own counterweights, not by means of lever 55. At any time, either dog may pivot toward accumulate position.

In FIG. 14, for example, a trolley is shown being pushed in a direction A toward a depending chain lug L which is stationary or is moving at a speed less than that at which the trolley is moving. The trolley can be connected to the lug merely by overtaking it, the dog 45 pivoting down, to permit the lug's passage, without activating lever 55 and its associated counterweight. It is noted that pin 65 is removed downwardly and independently from arm 63, without causing arm 63 or lever 55 to move.

Of course, neither dog will pivot out of interfering position with a chain lug unless positively pivoted by lever 55, for example, or some other control means. Thus dogs 45 and 46 positively connect the trolley to the chain lug and are not subject to disengagement even due to inclines, load swinging, towing pressure, and the like.

Each of FIGS. 1, 3, 6 and 7 shows leading trolleys 10 with dogs raised during trolley towing by a respective chain lug. In these figures, lever 55 is in its first position corresponding to a traveling position of the trolley when not accumulated.

In FIG. 2, lever 55 is shown rotated into a second or accumulate position where the dogs 45 and 46 are withdrawn into their inoperative positions, out of interference with the path of the chain lugs. In this condition, arm 63 engages pin 65 and moves it downwardly, rotating dog 45 into accumulate position against bias of counterweight 47. Arm 64 engages surface 66 on dog 45 to rotate and withdraw it into accumulate position. In this condition, dog 46 is not engaged and folded down by any succeeding chain lug passing over it.

When lever 55 is freed to pivot clockwise into its first position, arms 63 and 64 are respectively withdrawn from dogs 45 and 46, in direction away from each, and the dogs are freed to move into their operative raised positions by virtue of their own counterweights 47, 49, and independently of lever 55 and counterweight 62. While the pin 65 and surface 66 will tend to follow arms 63 and 64 respectively, due to the counterweights 47, 49 of the dogs, the dogs move without positive connection to the arms and thus independently thereof as that term is used therein.

TRAILING TROLLEY

As shown in FIG. 6, trailing trolley 12 is provided with a bumper 70 having a vertical cam surface 71 and a detent 72 along the bottom of the cam surface. The bumper 70 also has a bumper surface 73 for engagement by the leading trolley of a succeeding trolley train.

When the trolley trains are accumulated, the end or nose 61 of lever 55 of a following trolley train engages surface 71 of an accumulated train and rides downwardly (and rearwardly with respect to the following trolley to which it is pivoted) until it falls into detent 72, at which time lever 55 is in its second or accumulate position and dogs 45, 46 are withdrawn into their accumulate position. The succeeding trolley then engages the bumper surface 73.

At the same time, serrations 62a on counterweight 62 have moved into engagement with the underside of free track 26 and serve to brake the train, preventing bounce-back. The depth of detent 72 is selected to permit any slight bounce-back which might occur, despite the brake, without releasing the end or nose 61 of lever 55. While in the preferred embodiment, the braking surface is used, a brake is not always required.

Thus, trolley trains can accumulate along the free track, both pusher and hold back dogs of the leading trolleys being retracted until the forward trolley train is moved.

Upon movement of a preceding train downstream, the nose of lever 55 of the succeeding trolley is released from detent 72 and the lever moves to its first position, dogs 45 and 46 moving into operative position. The next chain lug of the power track folds down hold back dog 46, but engages dog 45 to tow the trolley train. Dog 46 is now free to move into its raised operative position to engage the lug and restrain the trolley against forward movement with respect to the lug in such instances as when the trolleys move down a decline in the track. The leading trolley is thus positively coupled to the chain lug and cannot be disengaged until further accumulation or some other positive control is exerted.

INTERMEDIATE TROLLEY

Intermediate trolley 11 (FIG. 6) has the same general configuration as the accumulating trolley, but is without pusher dogs, hold back dogs or accumulating bumpers. The usual function of this trolley is to carry the ends of the articulating load bars. Suitable fittings may be welded to the body of the trolley as described or the central hole shown in FIG. 6 can be used.

ACCUMULATION TROLLEY

A single accumulation trolley 35 is shown in FIGS. 8–10. This trolley is similar to the accumulating or leading trolleys 10, except that the trolley 35 is provided with a bumper 170. This bumper is similar to bumper 70 of trailing trolley 12, although a slightly different shape as shown. Like rearward parts of bumper 170 include a vertical cam surface 171, a detent 172 and a bumper surface 173. Other parts of the single accumulating trolley 35 are like those of the accumulating or leading trolley 10. The shape of bumper 170 differs from that of bumper 70 to accept the counterweight 62. Bumper 70 does not have to be relieved since trailing trolley 12 does not have a lever 55 and counterweight 62.

FIG. 9 illustrates a single accumulating trolley 35b coming into engagement with a forward trolley 35a. Like parts on these trolleys are defined by the same numbers followed by a respective trolley suffix letter. Nose 61b of lever 55b engages surface 171a and rides down it toward detent 172a. At the same time lever 55b rotates pusher dog 45b and hold down dog 46b toward withdrawn accumulate position. Counterweight 62b moves toward free track 26.

In FIG. 10, four single accumulating trolleys 35a–35d have accumulated, the ends of respective lever arms engaged in the detents as shown, like parts of these trolleys also designated by a similar number and a respective trolley suffix letter. When the forward end or nose 61 of each trolley falls into detent 172, the serrations on the respective counterweights 62 engage free track 26 and brake the trolleys against bounce-back. When the succeeding trolleys engage the preceding bumper surfaces 173, any slight bounce-back, occurring despite the brake, is accommodated by the depth of detent 172.

Apart from the fact that the single trolleys 35 include bumpers, the single accumulating trolleys, dogs and lever arms perform similarly to the leading trolleys and their like components. Also, it should be noted that the vertical cam surfaces 171, detents 172, and relatively short downward and rearward motion of the lever arms permit a very close trolley spacing, providing for an increase and improvement, in the number of trolleys which can be accumulated over a given track distance over previous conveyor capabilities. The lever does not require lifting of a heavy counterweight, and lesser forces are thus required for accumulating.

Accordingly, it will be appreciated that the invention provides improved power and free trolleys having pusher and hold back dogs which are not interlocked with an accumulation actuating lever and which permit operation from raised to withdrawn accumulate positions without actuation of the actuating lever and its counterweight apparatus. Wear and noise are reduced and, more importantly, the dogs are self-locked in operative position to prevent disengagement from chain lugs under adverse towing conditions.

ACCUMULATION THROUGH SWITCH

In another aspect of the invention, means are provided for accumulating trolley trains through a switch without causing jamming or requiring shutdowns. FIG. 13 illustrates a switching zone 80 which includes a main conveyor line or route 81 and a switch line or route 82. An appropriate switch 83 is included in the switching zone 80 but forms, in itself, no part of the invention. For the purpose of illustration only, main route 81 includes a power track (not shown) and a free track 85 defined by channels 85a and 85b. Switch route 82 includes a power track (not shown) and a free track 86 defined by channels 86a and 86b. Alternatively, switch route 82 can be free track alone, utilized with a decline so trolleys are conveyed therealong by gravity.

The switch 83 includes a lower tapered plate 87 as shown, in solid line non-switched position. The lower plate is disposed in the respective plane of the lower channel flange and carries the wheels of the trolleys through the switch in the direction the switch dictates. The switched position of switch 83 is shown in phantom. The plate is connected to a means such as an air cylinder or solenoid (also shown in phantom) for moving it between switched and unswitched position in response to a central signal.

Of course, the tracks 85, 86 are compatible with trolley trains as shown in FIGS. 6 and 7. For purposes of this description, trains of two or more trolleys may be conveyed through the switch.

In order to insure that a trolly train is moved sufficiently far into the switch route 82 so that the leading trolley can be picked up by a chain lug of the switch route's power track, or so that the trolley train can continue forward movement by gravity, the trolley train is pushed off the main route 81 into the switch route 82 by means of a main route's chain lug engaging a drive dog 90 in a trailing trolley 12. Accordingly, trailing trolley 12 is provided with a pivoting drive dog 90 which is pivoted between plates 91 and 92, forming the trailing trolley body, at pivot axis 93. The drive dog 90 has a lug engageable surface 94, and a lower arm 95 bearing a transverse cam following pin 96 extending outwardly of opposite arcuate slots 97, 98 in the trolley body. In one embodiment, the drive dog is yieldably counterweighted to stay in withdrawn position. In the embodiment shown, however, springs 99 bias the dog 90 into the retracted solid line position shown in the drawings. When the dog 90 is in raised position, as shown in phantom (FIGS. 6, 7 and 11), a chain lug engages the dog and pushes the trailing trolley along main route 81, thereby moving the leading trolley of that train further along switch route 82 when the switch zone is in switching condition.

To actuate drive dog 90 into raised position, a movable cam 100, according to this invention, is disposed along free track 85 from a point upstream of the switch 83 toward the switch. More particularly, the cam begins at a distance, upstream of the switch, slightly greater than the length of a train. The cam is moved into operative position, whenever the switch 83 is in "switched" position (and subject to the following described choke conditions), and engages the pin 96, pivoting dog 90 into raised position where a main route chain lug can engage it. The point of cam initation of the dog 90 as described insures the dog 90 will be raised at such time as the pusher dog 45 of the leading trolley in a train diverges from a forward chain lug, and thus insures continued movement of the train through the switch. This is illustrated in FIGS. 6 and 7 where it is evident that dogs 90 can be raised into their operative position, shown in phantom, for driving engagement with lugs 29 or 32, respectively, quickly after dogs 45 diverge from lugs 28 and 31 respectively, should the train of FIGS. 6 or 7 be driven through a switch.

The movable cam 100 is extremely important to operation of the invention as described. It includes a support member 101 attached to the track, and a pivoted hinge 102 permitting the cam 100 to be normally pivoted out of interference with pin 96 by a solenoid 103 (FIG. 12).

This aspect of the invention operates in the following manner. If each main and switch route in the switching zone are entirely free of preceding trolley trains, as determined by any suitable form of electric, mechanical or photo electric sensors, or the like, not forming part of this invention, then the switch can be switched and cam 100 pivoted into operative position by an appropriate solenoid 103 in response to a control signal, to raise dog 90 for driving the train through the switch. If the switch route, however, is "choked", (i.e., even partially occupied by a trolley train such as blocked or accumulated train, or a free train in the zone), the next trolley train would be driven into it causing a catastrophic jam, or at the least requiring a shutdown.

In accordance with this invention, however, whenever switching zone 80 is occupied, the solenoid 103 is not energized. Thus, dog 90 is not raised and the succeeding trolley train may, if it engages the trolley train occupying the switch zone, simply accumulate through the switch without damage. Further succeeding trolleys simply accumulate into the switch and switch zones until the "choked" condition is removed. Naturally, the sensed switching zone 80 of each route is selected of a length to accommodate at least a full trolley train downstream of the switch 83.

When the trailing trolley moves beyond cam 100, the drive dog 90 is automatically lowered by the springs 99. Alternatively, in the case of a counterweighted dog, a fold down cam can be used to insure the dog is inoperative. It should be appreciated that a bistable counterweighted or snap action drive dog could be used so that only a short movable cam 100 is required. In this case, a fold down cam would be necessary.

It should also be appreciated that appropriate trolley sensors are placed along the switch zone of the main route 81 to insure it is clear of trolleys. This permits switch and cam control at all times to permit accumulation through the switching zones in the event of a choked condition, and to prevent switching when a trolley in the main route switch zone is within the area of the switch so that it could jam the switch.

Accordingly, this aspect of the invention contemplates a movable cam which is moved into operative position for raising the drive dog in a trailing trolley only when the downstream switch zone is clear to accept the full length of the next trolley train. If a choke condition exists, the movable cam is simply not actuated and trolleys may accumulate through the switching zone on either route. The cam is then moved into operative position only when the next trolley is to be switched and only when the switch zone is free of preceding trolleys.

Of course, any suitable sensors and control circuitry or means, well within ordinary skill of a person in the art, could be provided for accomplishing movable cam control and these form no part of this invention in and of themselves.

Accordingly, the present invention provides an improved trolley apparatus for a power and free conveyor wherein push dogs and hold back dogs are not interlocked to an actuating accumulator lever and wherein the dogs are self-locked into operative position but are positively withdrawn by the lever in an accumulator position. The invention also provides accumulation of power and free trolleys through a switching zone without jams or shutdowns.

Many modifications and further advantages of the above will become readily apparent to those of ordinary skill in the art without departing from the scope of the invention and the applicant intends to be bound only by the claims appended hereto.

I claim:

1. In a power and free conveyor, improved accumulating trolley apparatus comprising:
    a trolley body,
    a pusher dog pivoted to said trolley body and having an operative drive position, wherein said pusher dog is engageable by a propelling member, and an accumulate position wherein said pusher dog is not engageable by a propelling member,
    a hold back dog pivoted to said trolley body and having an operative position wherein said hold back dog is engageable with said propelling member for holding said trolley body against forward movement with respect to same, and an accumulate position, wherein said hold back dog is not engageable with a propelling member,
    an actuating lever means in said trolley body movable from a first position to a second position for positively engaging and moving said pusher dog and said hold back dogs into said respective accumulate positions, and movable from said second position to said first position permitting said pusher dog and said hold back dog to return to their respective operative positions, said lever means extending forwardly of said trolley body for operative engagement with a preceding trolley,
    said pusher dog and said hold back dog each being independently mounted with respect to each other and being normally biased by their own weight toward moving into said respective operative positions, independently of each other and independently of said actuating lever means when said actuating arm means is in said first position,
    whereby said dogs are self-locking when in operative position and engaged by a propelling member.

2. Apparatus as in claim 1 wherein said actuating lever means positively engages respective surfaces of said dogs, when moved to said second position, for moving said dogs to said respective accumulate positions, and wherein said actuating lever means moves in a direction away from said dogs when moved from said second to said first position.

3. Apparatus as in claim 2 wherein said actuating lever means is yieldably biased from said second position to said first position.

4. Apparatus as in claim 3 wherein said trolley apparatus has forward and rearward wheels and said actuating lever means comprises a crank pivoted to said trolley body on the same pivot axis as that of said wheels.

5. Apparatus as in claim 4 wherein said actuating lever means includes a forward bumper engaging nose on said crank.

6. Apparatus as in claim 5 including a bumper extending rearwardly of said trolley body, said bumper having nose engaging bumper surfaces for engagement by a bumper engaging nose of another following trolley apparatus.

7. Apparatus as in claim 6 wherein said nose on said crank is moved downwardly and rearwardly when it engages a bumper of a preceeding trolley apparatus, and said crank is pivoted into said second position.

8. Apparatus as in claim 1 wherein said trolley apparatus is mounted on a track and said actuating lever means includes a counterweight means for biasing said actuator lever means into said first position, said counterweight movable toward said track when said actuator lever means is moved toward said second position, said counterweight means having a braking surface thereon engaging said track and braking said trolley when said actuator lever means is in said second position.

9. Apparatus as in claim 1 wherein the pivot axis of said actuating lever means is disposed transversely of said trolley body.

10. In a power and free conveyor having a track mounted plurality of trolley trains, each comprising at least forward and rearward trolleys, and propelling means for driving said trains, improved trolley drive control apparatus comprising:
    a forward trolley in each train having at least one pusher dog engageable with said propelling member for towing said train in a direction of travel,
    a rearward trolley in each train having a normally inoperative drive dog,
    a switch means in a switching zone for selectively switching between a first position for passing said trains along a main conveyor route, and a second position for selectively switching said trains into a second conveyor route,
    a movable cam means mounted on said track in proximity to said switch means and movable into and out of an operating position, said normally inoperative dog connected to a cam means follower, and said movable cam means movable into operative position for engaging said cam means follower and for pivoting said normally inoperative drive dog into operative position for engagement by a propelling means for driving said rearward trolley and said train into said switching means and away from said main conveyor route,
    said cam means being movable into operative position when both said main conveyor route and said second conveyor route are free of preceding trains a distance substantially equal to at least the length of a train beyond said switch means, and means responsive to a downstream conveyor condition for disabling said cam means wherein said cam means is maintained in an inoperative position when a preceding train is disposed within said distance, whereby trains can accumulate in and through said switch zone without being driven by engagement of said propelling member with said drive dog.

11. Apparatus as in claim 10 wherein said cam means extends from a point upstream of said switching means a distance greater than the length of a train, toward said switching means.

12. Apparatus as in claim 10 wherein said drive dog is biased into and disposed in an inoperative position when said cam means is in an inoperative position.

13. Apparatus as in claim 10 wherein said normally inoperative drive dog comprises a drive lug engageable surface at one end, a cam follower at another end extending in a direction transverse to said trolley, and being pivoted to said trolley intermediate said surface and said follower.

14. A single power and free conveyor trolley apparatus capable of accumulation, said trolley apparatus comprising:
 a trolley body,
 a pusher dog pivoted to said trolley body and biased into operative drive position for engagement by a propelling member of a power and free conveyor, said pusher dog being pivotable into an inoperative accumulate position,
 a hold back dog pivoted to said trolley body and biased into an operative hold back position for engaging said propelling member to hold said trolley against forward movement with respect thereto, said hold back dog being pivotable into an inoperative accumulate position out of interference with said propelling member,
 an actuating lever means pivoted to said trolley apparatus and having spaced dog control arm engaging portions of said pusher and hold back dogs, said actuating lever means bein yieldably biased into a drive position, being movable between drive and accumulate positions, respectively, and having a forward end movable downwardly and rearwardly when engaging a preceding trolley apparatus, for moving said lever means into its accumulate position, said dog control arms engaging and moving said dogs into respective accumulate positions when said forward end of said lever means moves downwardly and rearwardly,
 said dogs being biased into said respective operative drive and hold back positions and being independently movable with respect to said lever means said level means is in its drive position, said dogs moving into their respective operative drive and hold back positions, in response to said biases on them, when said lever means is moved into its drive position, whereby said dogs move into their respective operative drive and hold back positions independent of said yieldable bias on said lever means, and are self-locking in said operative positions when engaged by a propelling member, and
 including a rearwardly extending bumper on said trolley, said bumper having a rearward substantially vertical surface means for engagement by the forward end of a lever means of a succeeding trolley and having a detent means below said vertical surface for receiving said forward end, on said succeeding trolley, when the forward end has moved downwardly and rearwardly, and for holding said forward end and said lever means of said succeeding trolley in an accumulate position.

15. Apparatus as in claim 14 wherein said bias on said lever arm comprises a counterweight independent of said bumper, wherein said power and free conveyor trolley is mounted on a track, and wherein said counterweight includes a brake surface engaging said track and braking said trolley when said lever arm is in its accumulate position.

16. In a power and free conveyor, improved accumulating trolley apparatus comprising:
 a trolley body,
 a pusher dog pivoted to said trolley body and having an operative drive position, wherein said pusher dog is engageable by a propelling member, and an accumulate position wherein said pusher dog is not engageable by a propelling member,
 a hold back dog pivoted to said trolley body and having an operative position wherein said hold back dog is engageable with said propelling member for holding said trolley body against forward movement with respect to same, and an accumulate position, wherein said hold back dog is not engageable with a propelling member,
 an actuating lever means in said trolley body movable from a first position to a second position for positively moving said pusher dog and said hold back dogs into said respective accumulate positions, and movable from said second position to said first position permitting said pusher dog and said hold back dog to return to their respective operative positions, said lever means extending forwardly of said trolley body for operative engagement with a preceding trolley, whereby said dogs are pivoted to their respective accumulate positions,
 said pusher dog and said hold back dog each being independently mounted with respect to each other and being biased and moving into said respective operative positions, independently of each other and independently of said actuating lever means when said actuating arm means is in said first position, whereby said dogs are self-locking when in operative position and engaged by a propelling member, and
 wherein said actuating lever means comprises a lever having a forwardly extending pusher dog arm for moving said pusher dog into accumulate position, a rearwardly extending hold back dog arm for moving said hold back dog into its accumulate position, a forwardly extending actuating arm for engagement with a preceding trolley to pivot said dogs into said accumulate positions, and a rearwardly extending counterweight arm for normally biasing said lever means into said first position.

17. Apparatus as in claim 16 wherein said counterweight arm comprises a brake means for stopping and holding said trolley in response to arrival of said trolley in an accumulate position.

18. Apparatus as in claim 17 further including a bumper means extending rearwardly of said counterweight arm for operative engagement by the actuating lever means of a succeeding trolley for accumulation.

19. Apparatus as in claim 16 wherein said actuating lever means further comprises a shank extending between said pusher dog arm and said hold back dog arm at an upper end, and said actuating arm and said counterweight arm at a lower end.

20. Apparatus as in claim 19 wherein said actuating lever means is pivoted to said trolley body intermediate said pusher dog arm and said hold back dog arm.

21. Apparatus as in claim 20 wherein said trolley body includes trolley wheels mounting said body for movement and said actuating lever means is pivoted to said trolley body concentrically with one axis of said wheels.

22. In a power and free conveyor system having a plurality of trolleys, improved accumulating trolley apparatus comprising:
a trolley body,
a pusher dog pivoted to said trolley body and having an operative drive position, wherein said pusher dog is engageable by a propelling member, and an accumulate position wherein said pusher dog is not engageable by a propelling member,
a hold back dog pivoted to said trolley body and having an operative position wherein said hold back dog is engageable with said propelling member for holding said trolley body against forward movement with respect to same, and an accumulate position, wherein said hold back dog is not engageable with a propelling member,
an actuating lever means on said trolley body movable from a first position to a second position for positively engaging and moving said pusher dog and said hold back dogs into said respective accumulate positions, and movable from said second position to said first position permitting said pusher dog and said hold back dog to return to their respective operative positions, said lever means extending forwardly of said trolley body for operative engagement with a preceding trolley,
said pusher dog and said hold back dog each being independently mounted with respect to each other and being biased and moving into said respective operative positions, independently of each other and independently of said actuating lever means when said actuating arm means is in said first position,
whereby said dogs are self-locking when in operative position and engaged by a propelling member, and
a bumper means extending rearwardly from said trolley body, said bumper means having a bumper surface engageable by a forward end of said actuating lever means on a succeeding trolley for pivoting said lever means on said succeeding trolley into said second position, said detent means for holding said lever means in said second position whereby said dogs on said succeeding trolley are moved into and held in respective accumulate positions in response to their trolley engaging a preceding trolley.

23. Power and free accumulating trolley apparatus wherein each trolley includes a forwardly extending actuating lever means for engaging a preceding trolley and disengaging said trolley with said lever means from a drive means to permit it to accumulate, each trolley having a rear bumper means comprising a bumper surface for engagement by the lever means of a succeeding trolley, and a detent means below said bumper surface for receiving the lever means of a succeeding trolley, when it has engaged the bumper surface and moved downwardly, and for holding said lever means of a succeeding trolley in an accumulate position.

24. Apparatus as in claim 23 wherein said bumper surface is substantially vertical.

25. Apparatus as in claim 23 wherein said bumper means comprises a counterweight normally biasing said lever means into an operative drive position.

* * * * *

UNITED STATES PATENT AND TRADEMARK OFFICE
CERTIFICATE OF CORRECTION

PATENT NO. : 4,143,599
DATED : March 13, 1979
INVENTOR(S) : Robert Krammer, dec'd.

It is certified that error appears in the above-identified patent and that said Letters Patent are hereby corrected as shown below:

Col. 10   Line 15   "initation"        should be --initiation--

Col. 10   Line 58   "Alternatively"    should be -- Alternately --

Col. 12   Line 14   after "of", insert --one of--

Col. 13   Line 40   "arm"              should be --arms--

Col. 13   Line 41   "bein"             should be --being--

Col. 13   Line 55   "level"            should be --lever--

Col. 16   Line 15   "said detent"      should be --and detent--

Signed and Sealed this

Ninth Day of October 1979

[SEAL]

Attest:

RUTH C. MASON
Attesting Officer

LUTRELLE F. PARKER
Acting Commissioner of Patents and Trademarks